United States Patent
Yokoyama et al.

(10) Patent No.: US 10,151,261 B2
(45) Date of Patent: Dec. 11, 2018

(54) STOP CONTROL SYSTEM FOR DIRECT-INJECTION TYPE INTERNAL COMBUSTION ENGINE

(71) Applicant: MAZDA MOTOR CORPORATION, Hiroshima (JP)

(72) Inventors: Tetsuya Yokoyama, Higashihiroshima (JP); Ryoji Kagawa, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 150 days.

(21) Appl. No.: 15/258,857

(22) Filed: Sep. 7, 2016

(65) Prior Publication Data

US 2017/0074192 A1 Mar. 16, 2017

(30) Foreign Application Priority Data

Sep. 11, 2015 (JP) .................. 2015-180144

(51) Int. Cl.
*F02D 41/04* (2006.01)
*B60K 6/46* (2007.10)
(Continued)

(52) U.S. Cl.
CPC ............. *F02D 41/042* (2013.01); *B60K 6/46* (2013.01); *F01C 1/22* (2013.01); *F01C 20/06* (2013.01); *F01C 21/18* (2013.01); *F02N 11/04* (2013.01); *F02N 19/005* (2013.01); *F02B 53/10* (2013.01); *F02B 53/12* (2013.01); *F02D 2250/24* (2013.01); *F02N 2019/008* (2013.01)

(58) Field of Classification Search
CPC ... B60K 6/46; F01C 1/22; F01C 17/00; F01C 20/06; F01C 21/08; F01C 21/18; F02B 1/04; F02B 1/06; F02B 1/14; F02B 2053/005; F02B 2075/125; F02B 53/00; F02B 53/02; F02B 53/04; F02B 53/10; F02B 53/12; F02B 53/14; F02B 55/00; F02D 41/042; F01N 11/04; F01N 19/005; F01N 2019/008
USPC ......... 123/18 A, 18 R, 43 A, 45 A, 200–249
See application file for complete search history.

(56) References Cited

U.S. PATENT DOCUMENTS

| | | | | |
|---|---|---|---|---|
| 5,402,762 A | * | 4/1995 | Yamada | ................ F02D 41/042 123/198 DB |
| 7,142,973 B2 | * | 11/2006 | Ando | .................... F02D 41/009 701/112 |

(Continued)

FOREIGN PATENT DOCUMENTS

| | | |
|---|---|---|
| JP | H06-137197 A | 5/1994 |
| JP | 2005-105885 A | 4/2005 |

(Continued)

*Primary Examiner* — Jason Newton
(74) *Attorney, Agent, or Firm* — Studebaker & Brackett PC (57) ABSTRACT

A stop control system includes a direct-injection type internal combustion engine, a fuel injection valve, an accessory configured to be driven by the internal combustion engine, and a controller configured to operate the internal combustion engine. The controller is configured to control the accessory during a period from start of fuel cut to a moment immediately after the internal combustion engine stops, such that when the internal combustion engine stops completely, the output shaft comes, in a rotational direction, to a target stop position where an intake port is closed.

15 Claims, 8 Drawing Sheets

(51) Int. Cl.
*F02N 11/04* (2006.01)
*F02N 19/00* (2010.01)
*F01C 1/22* (2006.01)
*F01C 20/06* (2006.01)
*F01C 21/18* (2006.01)
F02B 53/10 (2006.01)
F02B 53/12 (2006.01)

(56) References Cited

U.S. PATENT DOCUMENTS

| | | | | |
|---|---|---|---|---|
| 7,243,627 | B2* | 7/2007 | Izumi | F01L 1/022 |
| | | | | 123/90.17 |
| 9,827,974 | B1* | 11/2017 | Boyko | B60W 20/12 |
| 9,856,846 | B2* | 1/2018 | Matsufuji | F02N 11/0818 |
| 2003/0213454 | A1* | 11/2003 | Grieser | F01L 1/34 |
| | | | | 123/179.18 |
| 2005/0066933 | A1* | 3/2005 | Kaita | B60K 6/445 |
| | | | | 123/198 R |
| 2006/0124090 | A1* | 6/2006 | Hirose | F02D 13/023 |
| | | | | 123/90.15 |
| 2007/0062476 | A1* | 3/2007 | Ota | F02B 23/104 |
| | | | | 123/179.4 |
| 2007/0233357 | A1* | 10/2007 | Sugai | B60K 6/48 |
| | | | | 701/105 |
| 2009/0287400 | A1* | 11/2009 | Pursifull | F02D 41/009 |
| | | | | 701/113 |
| 2010/0037842 | A1* | 2/2010 | Hattori | F01L 1/352 |
| | | | | 123/90.15 |
| 2010/0211288 | A1* | 8/2010 | Gibson | F02D 13/0261 |
| | | | | 701/103 |
| 2014/0121951 | A1* | 5/2014 | Bidner | F02D 29/02 |
| | | | | 701/112 |
| 2014/0163840 | A1* | 6/2014 | Kojima | F02D 29/02 |
| | | | | 701/103 |
| 2015/0369199 | A1* | 12/2015 | Nakamura | F01L 13/0026 |
| | | | | 123/179.4 |
| 2016/0053736 | A1* | 2/2016 | Matsufuji | F02N 11/0855 |
| | | | | 701/112 |
| 2017/0074192 | A1* | 3/2017 | Yokoyama | F02D 41/042 |

FOREIGN PATENT DOCUMENTS

| | | | | |
|---|---|---|---|---|
| JP | 2006-037865 A | | 2/2006 | |
| JP | 2007-270775 A | | 10/2007 | |
| JP | 2010-229982 A | | 10/2010 | |
| JP | 2014190159 A | * | 10/2014 | ......... F02N 11/0855 |
| JP | 2017053331 A | * | 3/2017 | ......... F02D 41/042 |

* cited by examiner

STOP CONTROL SYSTEM FOR DIRECT-INJECTION TYPE INTERNAL COMBUSTION ENGINE

CROSS-REFERENCE TO RELATED APPLICATION

This application claims priority to Japanese Patent Application No. 2015-180144 filed on Sep. 11, 2015, the entire disclosure of which is incorporated by reference herein.

BACKGROUND

The present disclosure relates to a stop control system for a direct-injection type internal combustion engine.

Japanese Unexamined Patent Publication No. 2006-37865 describes that an HC trap filter is attached to an intake passage of an internal combustion engine. The HC trap filter prevents the release of evaporative emission of unburnt fuel to the outside when the internal combustion engine is stationary.

Japanese Unexamined Patent Publication No. 2010-229982 describes that a rotary piston engine is automatically stopped when a predetermined condition is satisfied, that is to say, the so-called idling stop is performed. This rotary piston engine is configured such that fuel is directly injected into a working chamber which is in the intake stroke. During a period from start of fuel cut that is cutting off of fuel supply to the rotary piston engine to the moment when the rotary piston engine stops, an accessory provides with rotational resistance to this rotary piston engine. In this manner, when the internal combustion engine stops completely, the rotor (in other words, the output shaft) is caused to come, in its rotational direction, to a predetermined position that is suitable for the next automatic start.

SUMMARY

Meanwhile, when the internal combustion engine is stationary, it is necessary to prevent the evaporation of, for example, fuel that has adhered to the surface of an inner wall of a chamber defined in an internal combustion engine (i.e., a combustion chamber in the case of a reciprocating engine, or a working chamber in the case of a rotary engine) and fuel that has seeped from a fuel injection valve due to poor oil tightness. It is also necessary to prevent the resultant evaporative emission from being released into the atmosphere through the intake passage. Measures against such fuel evaporation is needed not only when an internal combustion engine is automatically stopped as described in Japanese Unexamined Patent Publication No. 2010-229982, but also when the driver intentionally forces the internal combustion engine to stop.

Attaching a filter to an intake passage as described in Japanese Unexamined Patent Publication No. 2006-37865 is effective at preventing the release of evaporative emission. As described in this publication, however, merely attaching the filter to the intake passage inconveniently leads to a considerable decrease in the intake efficiency. Also as described in this publication, it is disadvantageous to adopt a configuration in which the filter is retracted from the intake passage when the internal combustion engine is in operation, and closes the intake passage only when the internal combustion engine is stationary because such a configuration needs to be a large-scale one.

The technique disclosed herein has been developed in view of the foregoing problems. This technique advantageously reduces release of evaporative emission of fuel into the atmosphere through an intake passage when an internal combustion engine is stationary.

Specifically, the present disclosure relates to a stop control system. This system includes: a direct-injection type internal combustion engine; a fuel injection valve configured to inject fuel directly into a chamber defined in the internal combustion engine; an accessory configured to be driven by the internal combustion engine; and a controller configured to operate the internal combustion engine.

The internal combustion engine has an intake port communicating with an inside of the chamber and configured to be opened and closed in synchronization with rotation of an output shaft of the internal combustion engine. The controller is configured to control the accessory during a period from start of fuel cut that is cutting off of fuel supply to the internal combustion engine by the fuel injection valve to a moment immediately after the internal combustion engine stops, such that when the internal combustion engine stops completely, the output shaft comes, in a rotational direction, to a target stop position where the intake port is closed.

DETAILED DESCRIPTION

The present disclosure relates to a stop control system. This system includes: a direct-injection type internal combustion engine; a fuel injection valve configured to inject fuel directly into a chamber defined in the internal combustion engine; an accessory configured to be driven by the internal combustion engine; and a controller configured to operate the internal combustion engine.

The internal combustion engine has an intake port communicating with an inside of the chamber and configured to be opened and closed in synchronization with rotation of an output shaft of the internal combustion engine. The controller is configured to control the accessory during a period from start of fuel cut that is cutting off of fuel supply to the internal combustion engine by the fuel injection valve to a moment immediately after the internal combustion engine stops, such that when the internal combustion engine stops completely, the output shaft comes, in a rotational direction, to a target stop position where the intake port is closed.

With this configuration, the controller controls the accessory during a period from start of fuel cut to a moment immediately after the internal combustion engine stops. The accessory driven by the internal combustion engine is capable of providing rotational resistance to the internal combustion engine. For example, the accessory may be configured as a generator (including an alternator) driven by the engine or a compressor included in an air conditioner and driven by the engine.

Here, the control of the accessory does not have to be performed only during the period in which the rpm of the internal combustion engine is gradually decreasing due to the start of the fuel cut to the moment when the internal combustion engine stops. The accessory may be controlled immediately after the internal combustion engine stops, thereby causing the output shaft of the internal combustion engine to come, in its rotational direction, to the target stop position.

This control of the accessory causes the output shaft of the internal combustion engine to come to the target stop position where the intake port is closed when the internal combustion engine stops completely. Consequently, even if the fuel or other substances that have adhered to the inner surface of the wall of the chamber and that have seeped from the fuel injection valve due to poor oil tightness evaporate when the internal combustion engine is stationary, the release of the resultant evaporative emission into the atmosphere through the intake passage may be reduced.

Note that the stop of the internal combustion engine as used herein refers to not only the so-called automatic stop where the engine is automatically stopped upon satisfaction of a predetermined condition, but also the so-called forced stop where the driver intentionally forces an internal combustion engine to stop.

The stop control system may further include a position information acquirer configured to estimate or detect a position to which the output shaft comes in the rotational direction when the internal combustion engine stops. The controller may control the accessory based on a signal from the position information acquirer so as to cause the output shaft to come, in the rotational direction, to the target stop position when the internal combustion engine stops completely.

This configuration may causes the output shaft to come, in the rotational direction, to the target stop position more precisely, when the internal combustion engine stops completely.

In the stop control system, the internal combustion engine may be configured as a rotary piston engine which includes a triangle rotor making planetary rotations around the output shaft, and which is configured to cause intake, compression, expansion, and exhaust strokes to take place sequentially in three working chambers separated from each other by three apexes of the rotor, while moving the three working chambers in a circumferential direction. An injection opening of the fuel injection valve may be formed in a trochoidal inner peripheral surface of a rotor housing that houses the rotor, such that the fuel is injected from the injection opening into the working chamber being in the intake stroke. The intake port may communicate with an inside of the working chamber being in the intake stroke, and may have an opening at a point on a retard side in a rotational direction of the rotor with respect to the injection opening of the fuel injection valve. The target stop position for the rotary piston engine may be a position where the rotor closes the intake port, and one of the apexes of the rotor interposes between the opening of the intake port and the injection opening of the fuel injection valve.

The intake port of the rotary piston engine is opened and closed by the rotor that makes planetary rotations. The controller stops the rotary piston engine at a position where the rotor closes the intake port. Further, the controller adjusts the position of the rotor in the rotational direction (i.e. the position of the output shaft in the rotational direction) such that an apex of the rotor interposes between the opening of the intake port and the injection opening of the fuel injection valve when the internal combustion engine stops completely. When the internal combustion engine stops completely, the working chamber where the injection opening of the fuel injection valve is present is in the compression stroke.

With this configuration, even if the fuel that has seeped from the injection opening of the fuel injection valve due to, for example, poor oil tightness evaporates, since the working chamber where the injection opening is present is separated from the working chamber communicating with the intake port, the resultant evaporative emission may be hindered from entering the working chamber communicating with the intake port. Further, since the intake port is closed by the rotor, the release of the evaporative emission into the atmosphere may be reduced more reliably.

The accessory may be configured as a generator capable of driving the internal combustion engine. The controller may cause, by driving the internal combustion engine by the generator, the output shaft to come, in the rotational direction, to the target stop position when the internal combustion engine stops completely.

In this manner, the generator appropriately provides rotational resistance to the internal combustion engine of which the rpm is gradually decreasing due to the start of fuel cut, which may enable adjustment of the position to which the output shaft comes in its rotational direction when the internal combustion engine stops completely. Thus, the output shaft may come to the target stop position when the internal combustion engine stops completely. Even if the output shaft comes to a position different from the target stop position when the internal combustion engine stops, operating the generator to drive the internal combustion engine may enable correction, thereby causing the output shaft come, in its rotational direction, to the target stop position.

During a period from start of the fuel cut which is carried out, upon satisfaction of a predetermined condition, for automatically stopping the internal combustion engine to a moment when the internal combustion engine stops, the controller may control the accessory such that the output shaft comes, in the rotational direction, to the target stop position when the internal combustion engine stops completely.

Further, the controller may cause, by providing rotational resistance to the internal combustion engine by the accessory, the output shaft to come, in the rotational direction, to the target stop position when the internal combustion engine stops completely.

Thus, when the internal combustion engine is going to be automatically stopped, the position to which the output shaft comes in its rotational direction may be adjusted. As a result, the output shaft may be caused to come, in the rotational direction, to the target stop position accurately when the internal combustion engine stops.

The accessory may be configured as a generator capable of driving the internal combustion engine. If the output shaft comes, in the rotational direction, to a position different from the target stop position when the internal combustion engine stops, the controller may drive the internal combustion engine by the generator so as to cause the output shaft to come, in the rotational direction, to the target stop position.

When the internal combustion engine is automatically stopped, the output shaft may come, in its rotational direction, to a position different from the target stop position even if the accessory has been controlled during the period from the start of fuel cut to the moment when the internal combustion engine stops. In such a case, the internal combustion engine is driven by the generator immediately after the internal combustion engine stops. In this manner, the output shaft may be reliably caused to come, in its rotational direction, to the target stop position. That is to say, the intake port may be reliably closed when the internal combustion engine is stationary.

The controller may be configured to actuate, after the start of the fuel cut, an ignition plug in the chamber being in a compression stroke.

Thus, unburnt fuel remaining in the chamber may be burnt when the compression stroke or the expansion stroke takes place in the chamber in a period from the start of the fuel cut to the moment when the internal combustion engine stops. As a result, unburnt fuel remaining in the chamber when the internal combustion engine stops completely may be reduced to the smallest possible amount, and generation of the evaporative emission may be reduced.

The present disclosure relates to a stop control system. The system includes: a direct-injection type internal combustion engine having an intake port configured to be opened and closed in synchronization with rotation of an output shaft; a fuel injection valve configured to inject fuel directly into a chamber which communicates with the intake port; an accessory configured to be driven by the internal combustion engine; a position information acquirer configured to estimate or detect a position to which the output shaft comes in a rotational direction when the internal combustion engine stops; and an accessary controller configured to receive a signal from the position information acquirer during a period from start of fuel cut that is cutting off of fuel supply to the internal combustion engine by the fuel injection valve to a moment immediately after the internal combustion engine stops, and to output a signal for controlling the accessory such that when the internal combustion engine stops completely, the output shaft comes, in a rotational direction, to a target stop position where the intake port is closed.

The accessory may be configured as a generator. The system may further include an inverter provided between the generator and the accessary controller. The accessary controller may output a control signal to the inverter, and control the generator via the inverter.

During a period from the start of the fuel cut to a moment when the internal combustion engine stops, the accessary controller may output a control signal to the inverter such that the generator provides rotational resistance to the internal combustion engine.

Immediately after a moment when the internal combustion engine stops, the accessary controller may output a control signal to the inverter such that the generator drives the internal combustion engine so as to cause the output shaft to come, in the rotational direction, to a target stop position.

Disclosed herein is a stop control method. This method includes: cutting off fuel supply to a direct-injection type internal combustion engine; during a period from the cutting off of the fuel supply to a moment when the internal combustion engine stops, controlling an accessory coupled to the internal combustion engine such that rotational resistance is applied to the internal combustion engine; and causing an output shaft of the internal combustion engine to come, in a rotational direction, to a target stop position where an intake port is closed, when the internal combustion engine stops completely.

The method may further include, immediately after internal combustion engine stops, causing the accessory to drive the internal combustion engine so as to cause the output shaft to come, in a rotational direction, to the target stop position.

Figure 1:
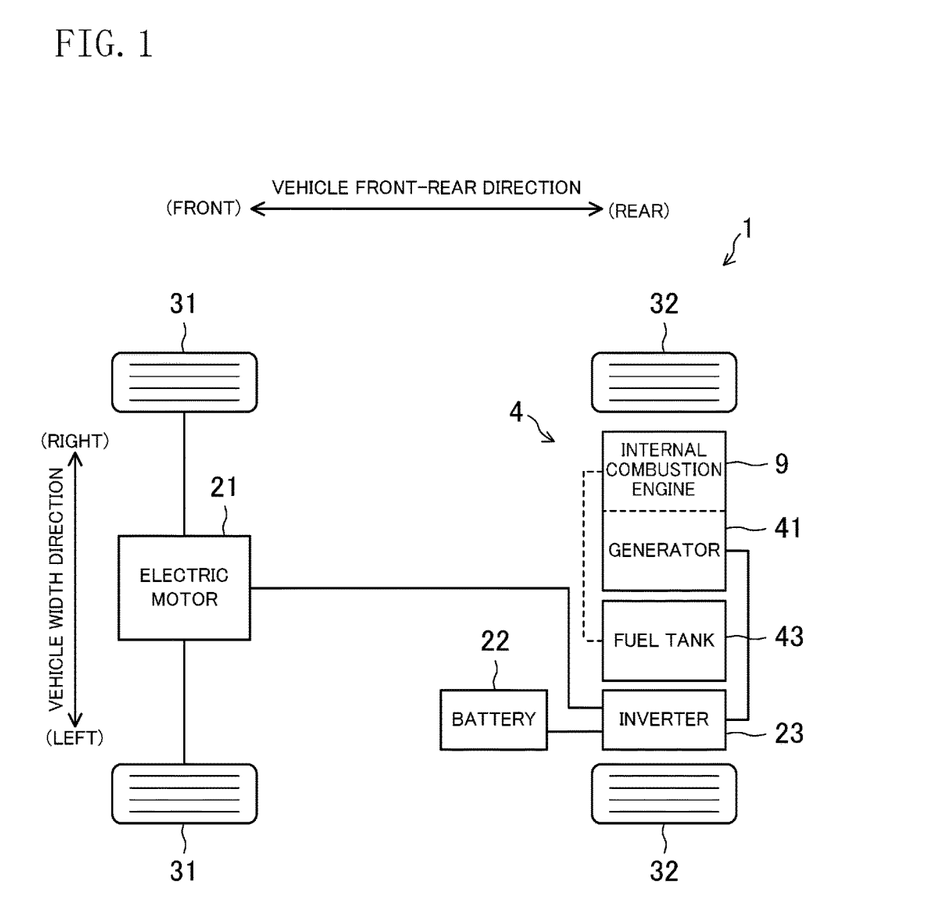
FIG. 1 shows a configuration for an automobile including a direct-injection type internal combustion engine.

A stop control system for a direct-injection type internal combustion engine disclosed herein will be described below with reference to the drawings. Note that the following description is provided as a mere example. FIG. 1 shows a configuration for an automobile including a stop control system for a direct-injection type internal combustion engine (hereinafter simply referred to as the engine) mounted therein. This automobile is configured as an electric vehicle 1, which will be detailed later. Although not shown, this electric vehicle 1 has a charging plug through which a battery 22 can be charged by a standard charger or a quick charger. The electric vehicle 1 further includes a range extender 4 mounted therein for extending the cruising distance of the vehicle. The internal combustion engine is included in the range extender 4.

As shown in FIG. 1, this electric vehicle 1 includes an electric motor 21 for running, the battery 22, and an inverter 23. The battery 22 stores therein power for running. The battery 22 is configured as a lithium ion battery, for example, but is not limited to such a lithium ion battery. The electric motor 21 is supplied with, via the inverter 23, power from the battery 22. The electric motor 21 drives drive wheels, i.e., the front wheels 31 in the example shown in FIG. 1. Driving the front wheels 31 causes the electric vehicle 1 to run. Further, the electric motor 21 functions as a generator when the vehicle is decelerated, for example. The battery 22 is charged with regenerative power.

The range extender 4 has a generator 41, the engine 9 configured to drive the generator 41, and a fuel tank 43 configured to store fuel to be supplied to the engine 9. The generator 41 generates power with which the battery 22 is charged. Here, the fuel is a liquid fuel, specifically, gasoline. The power generated by driving the generator 41 is sent to the battery 22 via the inverter 23. As will be described later, the generator 41 also functions as a starter for starting the engine 9 when driven with power supplied from the battery 22.

The engine 9, of which the derails are omitted from the drawings, has an output shaft coupled to the generator 41. The engine 9 operates by being supplied with the fuel from the fuel tank 43. Operating the engine 9 drives the generator 41, thereby generating power. Here, the engine 9 is configured as a small rotary piston engine including a single rotor. The details of a configuration for the rotary piston engine will be described later.

Figure 2:
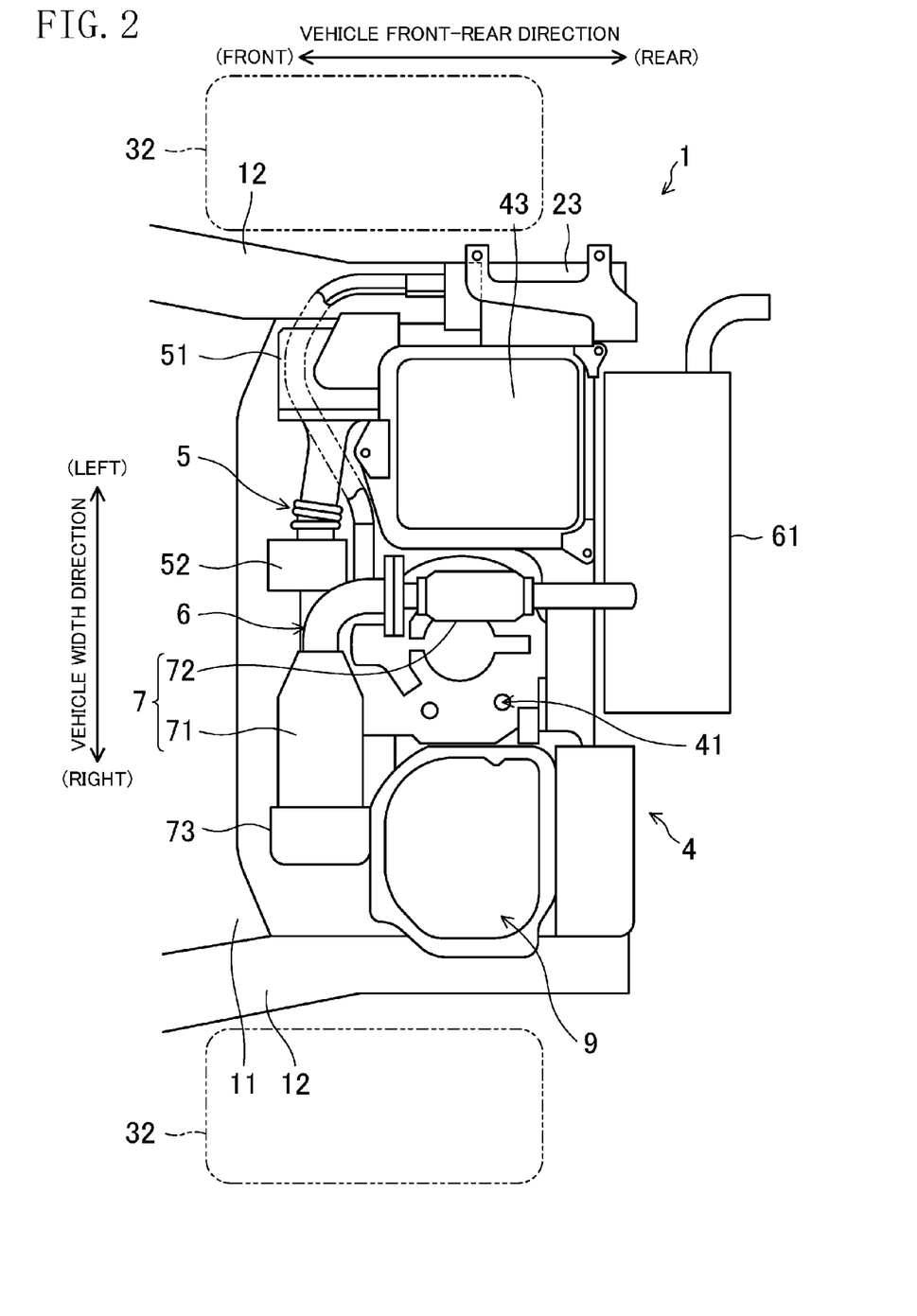
FIG. 2 is a bottom view showing a configuration for a range extender unit.

FIG. 2 shows a configuration for the rear of the electric vehicle 1. FIG. 2 is a bottom view of the rear of the electric vehicle 1. The range extender 4 is configured as a unit, and mounted in the rear of the electric vehicle 1. Specifically, the range extender 4 is arranged rearward with respect to a rear cross member 11 that extends in the vehicle width direction, and between a pair of rear side frames 12 and 12 that extend in the vehicle front-rear direction. The range extender 4 is arranged between the right and left rear wheels 32 and 32.

The engine 9 is arranged in a right-hand portion of the vehicle in the vehicle width direction. In this example, the engine 9 is arranged such that its output shaft (i.e., its eccentric shaft) extends in the vertical direction. Although not shown in detail in FIG. 2, the engine 9 has its intake port provided in a rotor housing and opening toward the front of the vehicle. The engine 9 has its exhaust ports provided in side housings arranged in a front part of the engine 9, and opening toward the front.

The engine 9 is connected to an intake passage 5 and an exhaust passage 6. The intake passage 5 is arranged frontward with respect to the engine 9 and extends leftward in the vehicle width direction. An air cleaner 51 coupled to the left end of the intake passage 5 is arranged in a left-hand portion of the vehicle in the vehicle width direction. The air cleaner 51 does not include therein an HC trap filter or any other similar component. In an intermediate portion of the intake passage 5, a throttle body 52 that houses a throttle valve 423 (see FIG. 4) is arranged.

The exhaust passage 6 is arranged frontward with respect to the engine 9 and blow the intake passage 5. The exhaust passage 6 also extends leftward in the vehicle width direction. The exhaust passage 6 is bent at substantially the middle of the vehicle width such that a portion thereof extends toward the rear of the vehicle. The exhaust passage 6 has its rear end connected to a silencer 61.

A catalytic device 7 is arranged in intermediate portions of the exhaust passage 6. The catalytic device 7 is comprised of a front stage catalytic portion 71 arranged in an upstream portion of the exhaust passage 6, and a rear stage catalytic portion 72 arranged downstream of the front stage catalytic portion 71. Each of the front and rear stage catalytic portions 71 and 72 houses a three-way catalyst. An electrically heated catalyst (EHC) 73 which is an electric heater is arranged upstream of the front stage catalytic portion 71. The front stage catalytic portion 71 and the EHC 73 are integral with each other, and in the shown example, are arranged to extend in the vehicle width direction. The rear stage catalytic portion 72 is arranged to extend in the vehicle front-rear direction in the shown example.

The generator 41 is to the left of, and adjacent to, the engine 9 in the vehicle width direction. The generator 41 is at substantially the middle of the electric vehicle 1 in the vehicle width direction. Although not shown, the output shaft of the engine 9 and the rotation shaft of the generator 41 are coupled to each other via an endless member such as a belt.

The fuel tank 43 is to the left of, and adjacent to, the generator 41 in the vehicle width direction. The fuel tank 43 has a shape approximate to a cube. The fuel tank 43 included in the range extender 4 has a predetermined limited capacity. Although not shown in FIG. 2, the fuel tank 43 is connected to the engine 9 via a fuel supply pipe. The inverter 23 is arranged to the left of, and adjacent to, the fuel tank 43 in the vehicle width direction.

(Configuration for Rotary Piston Engine)

Next, a configuration for the rotary piston engine 9 is described with reference to FIG. 3. The rotary piston engine 9 includes a rotor 91 having a substantially triangle shape, a rotor housing 92 that houses the rotor 91 therein, a pair of side housings 94 that sandwich the rotor housing 92 therebetween and define a rotor housing chamber 93. (The side housing 94 shown in FIG. 3 is the one arranged behind the rotor housing 92, and the other one arranged in front of the rotor housing 92 does not appear in FIG. 3.)

The outer peripheral surface of the rotor 91 is comprised of three rectangular faces. A recess 911 is formed in each of the rectangular faces.

The rotor housing 92 has a trochoidal inner peripheral surface 921 which has, in a cross section, a cocoon shape defined by the major axis Y and the minor axis Z. In each of three working chambers 95, 95, and 95 which are formed between the trochoidal inner peripheral surface 921 and the outer peripheral surface of the rotor 91, intake, compression, expansion, and exhaust strokes take place, thereby generating rotational force of the rotor 91. The rotational force of the rotor 91 is output via the eccentric shaft 96.

Figure 3:
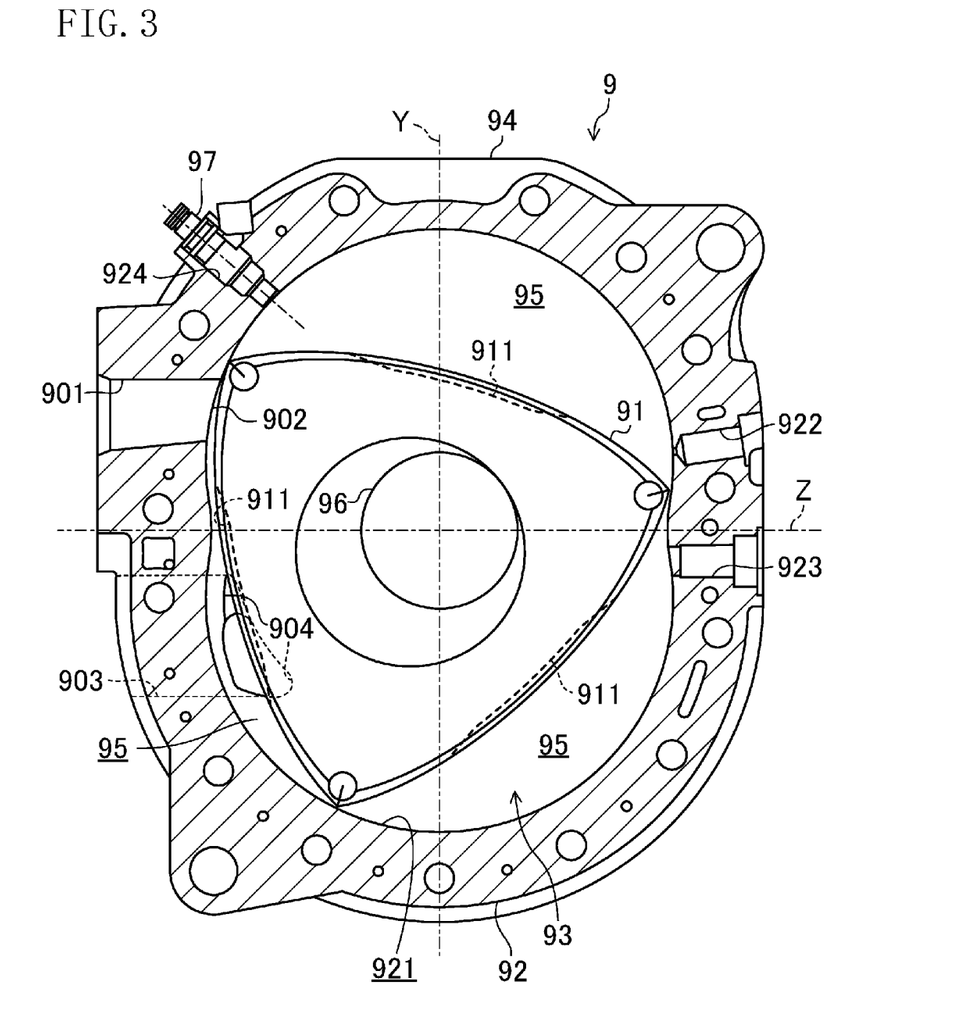
FIG. 3 is a cross-sectional view showing a configuration for a rotary piston engine.

In this rotary piston engine 9, an upper left region shown in FIG. 3 generally functions as an intake stroke region, and an upper right region shown in FIG. 3 generally functions as a compression stroke region. A lower right region shown in FIG. 3 generally functions as an expansion stroke region, and a lower left region shown in FIG. 3 generally functions as an exhaust stroke portion.

An intake port 901 is formed to penetrate the rotor housing 92. The intake port 901 is a so-called peripheral port. The intake port 901 has an opening 902 provided in the trochoidal inner peripheral surface 921, at a point above and near the minor axis Z such that the opening 902 communicates with the working chamber 95 that is in the intake stroke (i.e., the intake working chamber).

An exhaust port 903 is formed to penetrate each side housing 94. The exhaust port 903 is a so-called side port. The exhaust port 903 has an opening 904 provided in a side face of the side housing 94, at a point below and near the minor axis Z such that the opening 904 communicates with the working chamber 95 that is in the exhaust stroke (i.e., the exhaust working chamber). Note that in FIG. 3, the opening 904 of the exhaust port formed in the side housing arranged in front of the rotor housing 92, and the opening 904 of the exhaust port 903 formed in the side housing 94 arranged behind the rotor housing 92 are each indicated with a broken line.

While the intake port 901 and the exhaust ports 903 are formed on one of sides sandwiching the major axis Y, two ignition plugs are mounted onto the rotor housing 92, on the other side relative to the major axis Y. The two ignition plugs include an L-side ignition plug 421 and a T-side ignition plug 422 that sandwich the minor axis Z therebetween and are arranged in the leading side and the retard side of the rotor 91, respectively (see FIG. 4). Note that in the example shown in FIG. 3, ignition plug mounting holes 922 and 923 that are formed to penetrate the rotor housing 92 are shown.

A fuel injection valve 97 which directly injects fuel into the intake working chamber is mounted onto the rotor housing 92. The fuel injection valve 97 has its injection opening 971 formed in the trochoidal inner peripheral surface 921 and positioned between the opening 902 of the intake port 901 and the major axis Y.

In FIG. 3, the injection opening 971 of the fuel injection valve 97 is positioned at an upper left point of the trochoid inner peripheral surface 921 that is in a vertically-oriented cocoon shape. This position of the injection opening 971 is described rather as a position shifted from the major axis Y toward the retard side of the rotational direction of the rotor 91, than as a position near the major axis Y. Although the details are not shown, the injection opening 971 of the fuel injection valve 97 is positioned so as to face the intake working chamber that is at an initial stage of the intake stroke. This enables the fuel injection valve 97 to inject the fuel directly into the intake working chamber at the initial stage of the intake stroke.

The fuel injection valve 97 is inserted into a mounting hole 924 formed in the rotor housing 92, and fixed to the rotor housing 92. The mounting hole 924 for the fuel injection valve 97 is oriented such that its hole axis indicated with the dot-dash line extends toward the eccentric shaft 96 of the rotary piston engine 9, from outside to inside of the rotor housing 92. That is to say, in FIG. 3, the mounting hole 924 is formed in the rotor housing 92 such that the hole axis extends from an upper left portion toward a lower right portion of the FIG. 3. Consequently, the axis of the fuel injection valve 97 inserted in this mounting hole 924 also extends toward the eccentric shaft 96 of the rotary piston engine 9, from outside to inside of the rotor housing 92.

(Configuration for Stop Control System for Direct-injection Type Internal Combustion Engine)

Figure 4:
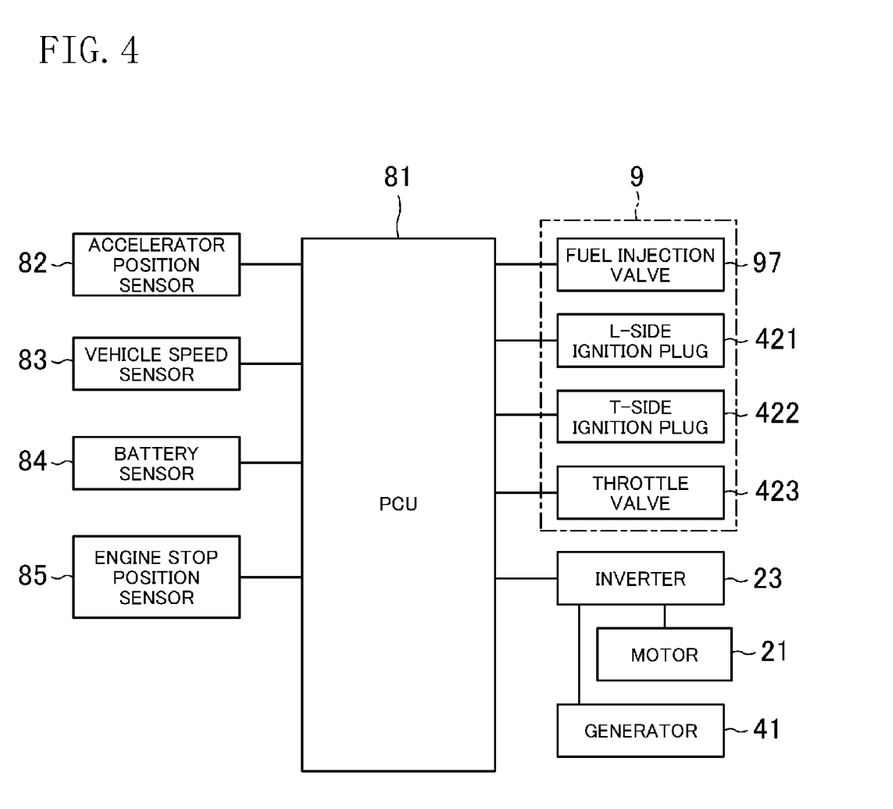
FIG. 4 is a block diagram showing a configuration related to control of a rotary piston engine.

As shown in FIG. 4, the stop control system includes a powertrain control unit (PCU) 81 functioning as a controller. The PCU 81 is connected to an accelerator position sensor 82 configured to detect a position of an accelerator, a vehicle speed sensor 83 configured to detect a vehicle speed, a battery sensor 84 configured to detect a state of charge (SOC) of the battery 22, and an engine stop position sensor 85 including an eccentric angle sensor and configured to estimate and/or detect a stop position of the engine 9. These sensors 82-85 each output detection signals to the PCU 81.

The PCU 81 outputs control signals, in order to control the engine 9, to the fuel injection valve 97 configured to inject fuel to the associated working chamber, the L-side ignition plug 421 and the T-side ignition plug 422 configured to ignite the air-fuel mixture in the associated working chamber, and the throttle valve 423 configured to regulate the amount of intake air to be introduced to the engine 9. The PCU 81 also outputs control signals to the inverter 23, and thereby controls the electric motor 21 and the generator 41 via the inverter 23.

Here, how the PCU 81 controls the running of the electric vehicle 1 is briefly described. The PCU 81 drives the electric motor 21 via the inverter 23, based on an accelerator position and a vehicle speed, for example. In this manner, the electric vehicle 1 is caused to run in accordance with the driver's request.

The PCU 81 starts the engine 9 if the SOC of the battery 22 becomes equal to or lower than a predetermined value (a value set as appropriate to be 10% or less, for example), and thereby causes the generator 41 to begin generating power. At startup of the engine 9, the generator 41, which is supplied with power and actuated as a prime mover, functions as a starter. After startup of the engine 9, the PCU 81 operates the engine 9 at a preset load and a preset rpm such that the generator 41 efficiently generates power. When the generator 41 is generating power, the engine 9 is operated at a high load and a high rpm. The PCU 81 operates the engine 9 such that the SOC of the battery 22 is maintained at a predetermined value. The engine 9 may be automatically stopped when the vehicle is running or stationary. Also, the driver may intentionally force the engine 9 to stop (by means of the so-called key-off).

(Stop Control of Engine)

In this electric vehicle 1, when the engine 9 is stationary, the fuel that has adhered to the surface of the inner wall of the working chamber 95 and that has seeped from the fuel injection valve 97 due to poor oil tightness may evaporate to turn into evaporative emission. The stop control system of the electric vehicle 1 is configured to reduce this fuel evaporation and the release of the evaporative emission through the intake passage. Specifically, when the engine 9 is automatically stopped or forced to stop, the PCU 81 causes the engine 9 to stop at a target stop position (i.e., the eccentric shaft 96 to come, in its rotational direction, to the target stop position), through the control of the generator 41. The target stop position corresponds to a position where the opening 902 of the intake port 901 is closed by the rotor 91.

Specifically, after stopping the fuel injection by the fuel injection valve 97 in order to stop the engine 9 (i.e., while the rpm of the engine 9 is gradually decreasing due to starting of fuel cut), the PCU 81 causes, based on the signal from the engine stop position sensor 85, the generator 41 to apply rotational resistance to the engine 9 such that the engine 9 stops at the target stop position where the rotor 91 closes the opening 902 of the intake port 901. The target stop position corresponds to the position of the rotor 91 in its rotational direction as shown in FIG. 3, that is to say, the target stop position is set such that an apex (i.e., an apex seal) of the rotor 91 interposes between the opening 902 of the intake port 901 and the injection opening 971 of the fuel injection valve 97. According to known control techniques, the generator 41 is caused to apply rotational resistance to the engine 9 when the engine 9 is stopped in the above manner (see, for example, Japanese Unexamined Patent Publication No. 2010-229982). Since various known control techniques may be adopted as appropriate, detailed description is omitted herein.

After starting the fuel cut, the PCU 81 actuates the L-side ignition plug 421 and/or T-side ignition plug 422 to burn, as much as possible, unburnt fuel remaining in the working chamber 95 in which the expansion stroke takes place subsequently to the compression stroke.

Thus, performing the control when the engine 9 is going to stop allows the engine 9 to stop completely at the target stop position. Consequently, the opening 902 of the intake port 901 is closed by the rotor 91, which may avoid, even if unburnt fuel evaporates in the working chamber 95, the release of the resultant evaporative emission into the atmosphere through the opening 902 of the intake port 901 and the intake passage.

Further, actuating the L-side ignition plug 421 and/or the T-side ignition plug 422 when the engine 9 is going to stop allows unburnt fuel remaining in the working chamber 95 to be burnt as much as possible. This may reduce the evaporation itself of the unburnt fuel in the working chamber 95.

Further, the target stop position is set to the position where an apex of the rotor 91 interposes between the opening 902 of the intake port 901 and the injection opening 971 of the fuel injection valve 97. Therefore, even if the fuel seeps from the injection opening 971 of the fuel injection valve 97 due to, for example, poor oil tightness and turns into evaporative emission in the working chamber 95, the situation in which the working chamber 95 is separated from the opening of the intake port 901 may reduce the release of the evaporative emission into the atmosphere. In particular, when the rotor 91 is at the position in its rotational direction shown in FIG. 3, the working chamber 95 where the injection opening 971 of the fuel injection valve 97 is present is in the compression stroke. This working chamber 95 is at an initial stage of the compression stroke, and the pressure inside this working chamber 95 is not so high. A relatively small pressure difference between two working chambers 95 between which an apex of the rotor 91 is interposed hinders the evaporative emission from flowing from the working chamber 95 being in the compression stroke into the working chamber 95 being in the intake stroke.

Figure 5:
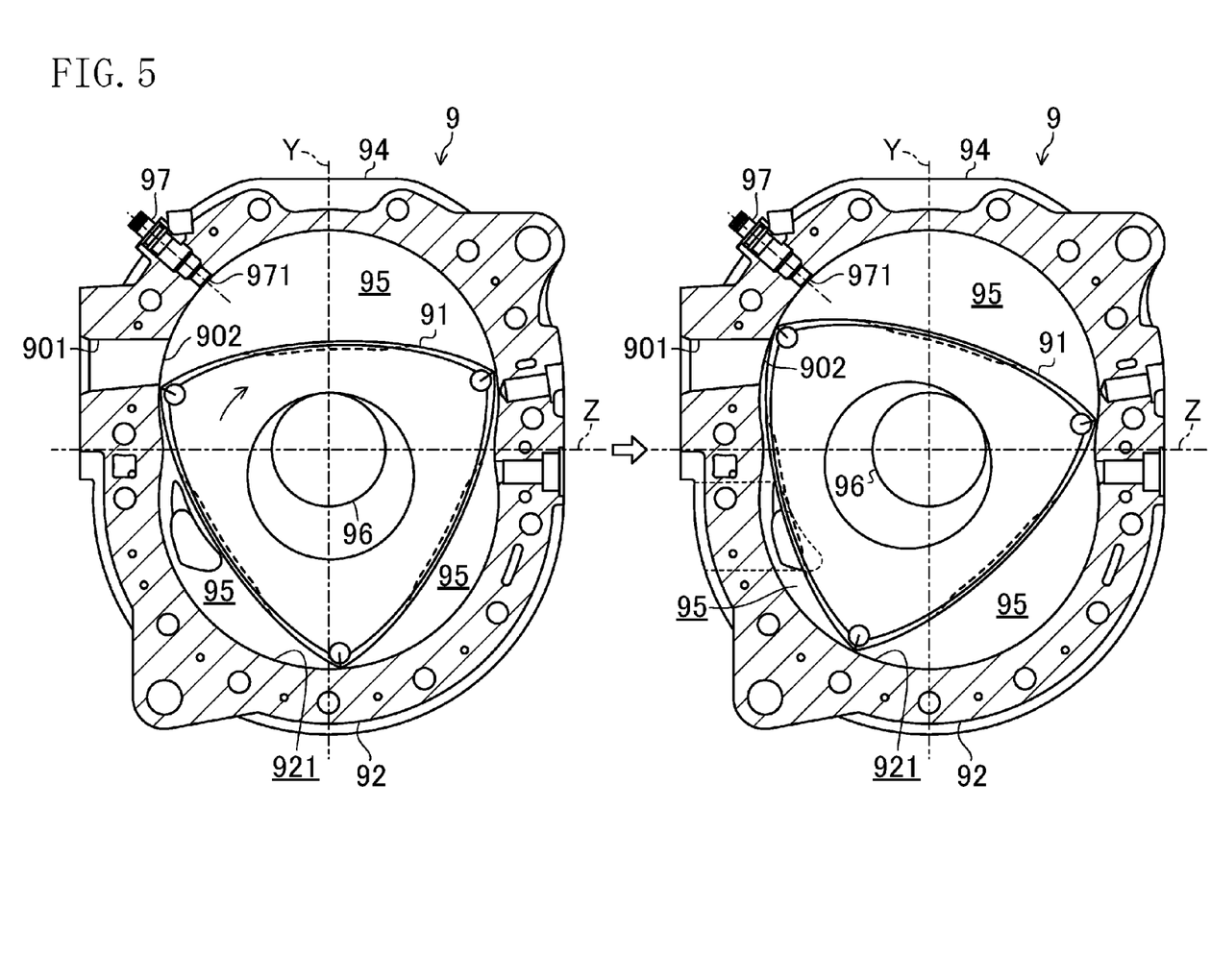
FIG. 5 is a transition diagram showing control in which a rotary piston engine is driven, immediately after its stop, by a generator.

As previously described, the position where the engine 9 actually stops may be different from the target stop position even if the PCU 81 has performed the control to cause the engine 9 to stop at the target stop position through the control of the generator 41 since the start of fuel cut. For example, if the engine 9 stops at a position different from the target stop position as shown in the left part of FIG. 5, the PCU 81 operates the generator 41 to drive the engine 9 (i.e., the generator 41 performs motoring of the engine 9), thereby causing the engine 9 to stop at the target stop position (see the right part of FIG. 5). Consequently, the intake port 901 is closed, which reduces the release of the evaporative emission into the atmosphere as previously described. Note that although the generator 41 is operated to rotate the rotor 91 forward so as to cause the engine 9 to stop at the target stop position in the example shown in FIG. 5, it is also possible to cause the engine 9 to stop at the target stop position by rotating the engine 9 backward by operating the generator 41.

Figure 6:
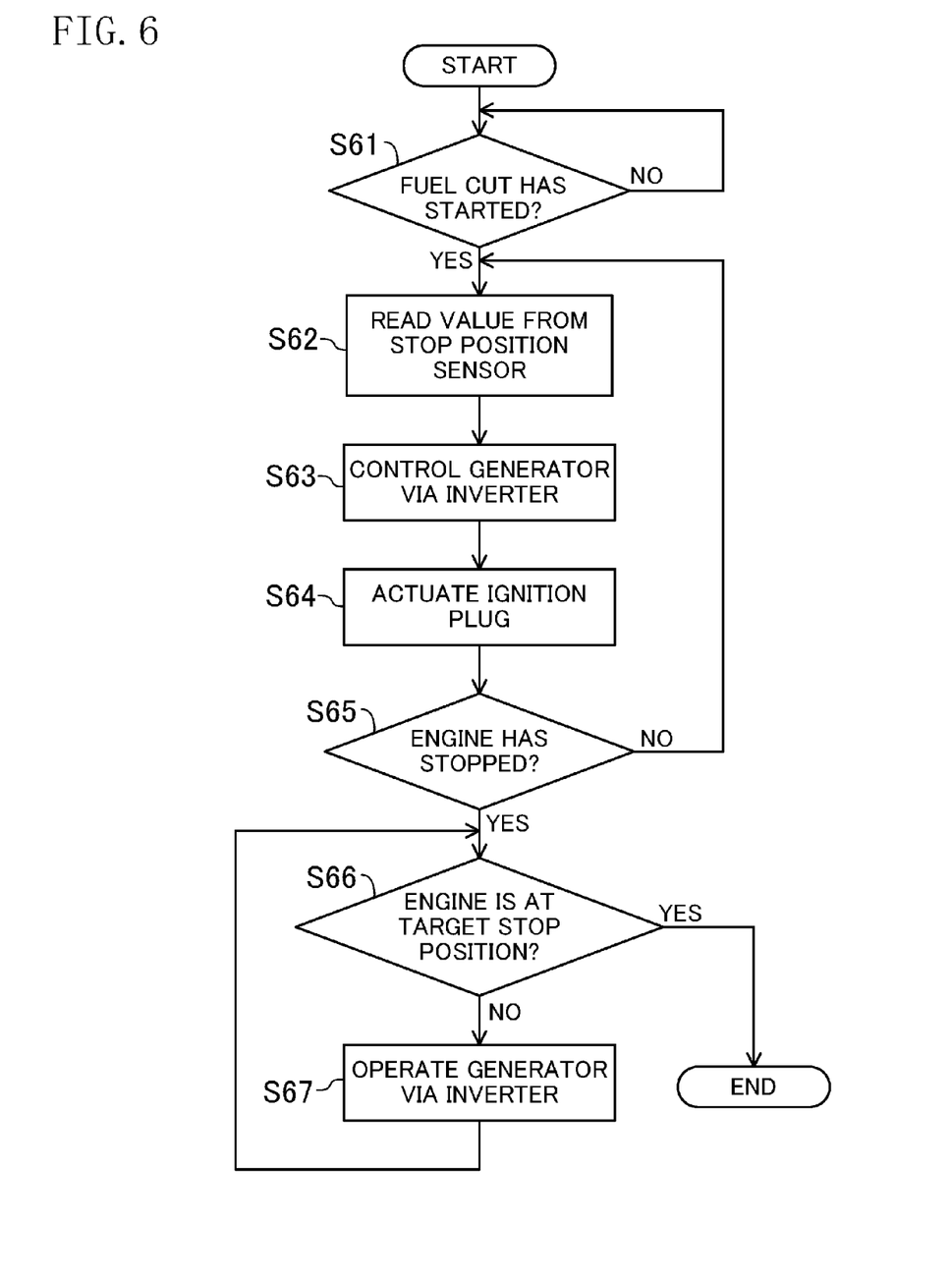
FIG. 6 is a flowchart showing stop control of a direct-injection type internal combustion engine.

FIG. 6 is a flowchart showing the stop control of the engine 9 that the PCU 81 carries out. In a step S61 subsequent to Start, the PCU 81 determines whether or not fuel cut has started. If the fuel cut has not started, the step S61 is repeated. If the fuel cut has started, the process proceeds to a step S62.

In the step S62, the PCU 81 reads a signal from the engine stop position sensor 85. In the subsequent step S63, the PCU 81 controls the generator 41 via the inverter 23, in accordance with the signal from the engine stop position sensor 85. The generator 41 provides rotational resistance to the engine 9.

In a step S64, the PCU 81 actuates the L-side ignition plug 421 and the T-side ignition plug 422. As described previously, the unburnt fuel remaining in the working chamber 95 is burnt.

In a step S65, the PCU 81 determines whether or not the engine 9 has stopped. If the engine 9 has not yet stopped, the PCU 81 returns to the step S62 and repeats the steps S62-S64. If the engine 9 has stopped, the process proceeds to a step S66.

In the step S66, the PCU 81 determines whether or not the engine 9 has stopped at the target stop position, based on a signal from the engine stop position sensor 85. If the engine 9 has stopped at the target stop position, the control is finished. On the other hand, if the engine 9 has stopped at a position different from the target stop position, the process proceeds to a step S67.

In the step S67, the PCU 81 operates the generator 41 via the inverter 23. The engine 9 is driven by the generator 41. After the step S67, the PCU 81 returns to the step S66. The PCU 81 finishes the control when the engine 9 stops at the target stop position.

As can be seen from the foregoing, the stop control system for a direct-injection type internal combustion engine disclosed herein includes the engine 9, the fuel injection valve 97 configured to inject fuel directly into one of the working chambers 95 defined in the engine 9, an accessory (i.e. the generator 41) configured to be driven by the engine 9, and the PCU 81 configured to operate the engine 9. The engine 9 has the intake port 901 that communicates with the working chamber 95 and is configured to be opened and closed in synchronization with the rotation of the eccentric shaft 96 of the engine 9. The PCU 81 is configured to control the generator 41 during the period from the start of fuel cut that is cutting off of fuel supply to the engine 9 by the fuel injection valve 97 to a moment immediately after the engine 9 stops, such that the eccentric shaft 96 comes, in its rotational direction, to the target stop position where the intake port 901 is closed, when the engine 9 stops completely.

Thus, when the engine 9 stops completely, the intake port 901 is closed. Therefore, even if the fuel or other substances that have adhered to the inner surface of the wall of the working chamber 95 and that have seeped from the fuel injection valve 97 due to poor oil tightness evaporate when the engine 9 is stationary, the release of the resultant evaporative emission into the atmosphere through the intake passage may be reduced.

The stop control system for a direct-injection type internal combustion engine further includes the engine stop position sensor 85 configured to estimate or detect a position to which the eccentric shaft 96 comes in its rotational direction when the engine 9 stops. The PCU 81 controls the generator 41 based on a signal from the engine stop position sensor 85 and thereby causes the eccentric shaft 96 to come, in its rotational direction, to the target stop position when the engine 9 stops completely.

This may enable the eccentric shaft 96 to come, in its rotational direction, to the target stop position more accurately when the engine 9 stops completely.

The engine 9 is configured as a rotary piston engine including the triangle rotor 91 that makes planetary rotations around the eccentric shaft 96, and configured to cause the intake, compression, expansion, and exhaust strokes to take place sequentially in the three actuation chambers 95 separated by the three apexes of the rotor 91 while moving the working chambers 95 in the circumferential direction. The injection opening 971 of the fuel injection valve 97 is formed in the trochoidal inner peripheral surface 921 of the rotor housing 92 that houses the rotor 91 therein, such that the injection opening 971 injects fuel into the working chamber 95 that is in the intake stroke. The intake port 901 communicates with the inside of the working chamber 95 that is in the intake stroke, and opens at a position toward the retard side of the rotor 91 with respect to the injection opening 971 of the fuel injection valve 97. The target stop position for the rotary piston engine 9 is a position where the rotor 91 closes the intake port 901 and an apex of the rotor 91 interposes between the opening of the intake port 901 and the injection opening 971 of the fuel injection valve 97.

With this configuration, when the engine 9 stops completely, the injection opening 971 of the fuel injection valve 97 is separated from the opening of the intake port 901. Consequently, even if the fuel that has seeped from the fuel injection valve 97 evaporates, the release of the resultant evaporative emission into the atmosphere through the intake passage may be reduced.

The accessory is configured as the generator 41 capable of driving the engine 9. The PCU 81 drives the engine 9 via the generator 41 and thereby causes the eccentric shaft 96 to come, in its rotational direction, to the target stop position when the engine 9 stops completely.

The generator 41 appropriately provides rotational resistance to the engine 9 of which the rpm is gradually decreasing due to the start of fuel cut, which may enable adjustment of the position to which the eccentric shaft 96 comes in its rotational direction when the engine 9 stops completely. In this manner, the eccentric shaft 96 may be caused to stop, in its rotational direction, at the target stop position when the engine 9 stops completely. Even if the eccentric shaft 96 comes to, in its rotational direction, a position different from the target stop position when the engine 9 stops, operating the generator 41 to drive the engine 9 may enable correction, thereby causing the eccentric shaft 96 to come, in its rotational direction, to the target stop position.

During a period from start of the fuel cut which is carried out, upon satisfaction of a predetermined condition, for automatically stopping the engine 9 to a moment when the engine 9 stops, the PCU 81 causes the generator 41 to provide rotational resistance to the engine 9 such that the eccentric shaft 96 comes, in its rotational direction, to the target stop position when the engine 9 stops completely.

This may enable the eccentric shaft 96 to come, in its rotational direction, to the target stop position when the engine 9 stops automatically.

If the eccentric shaft 96 comes, in its rotational direction, to a position different from the target stop position when the engine 9 stops, the PCU 81 drives the engine 9 via the generator 41. In this manner, the eccentric shaft 96 may be caused to come, in its rotational direction, to the target stop position when the engine 9 stops completely.

Thus, the eccentric shaft 96 may be reliably caused to come, in its rotational direction, to the target stop position when the engine 9 stops completely.

The PCU 81 is configured to actuate the ignition plugs 421 and 422 in the working chamber 95 after starting the furl cut.

In this manner, unburnt fuel remaining in the working chamber 95 is burnt, which may reduce the fuel evaporation itself in the working chamber 95 when the engine 9 is stationary.

Note that although the intake port 901 of the rotary piston engine 9 is a peripheral port in the configuration above described, the intake port may be a side port. Although the exhaust port 903 is a side port in the configuration above described, the exhaust port may be a peripheral port.

(Variations)

Figure 7:
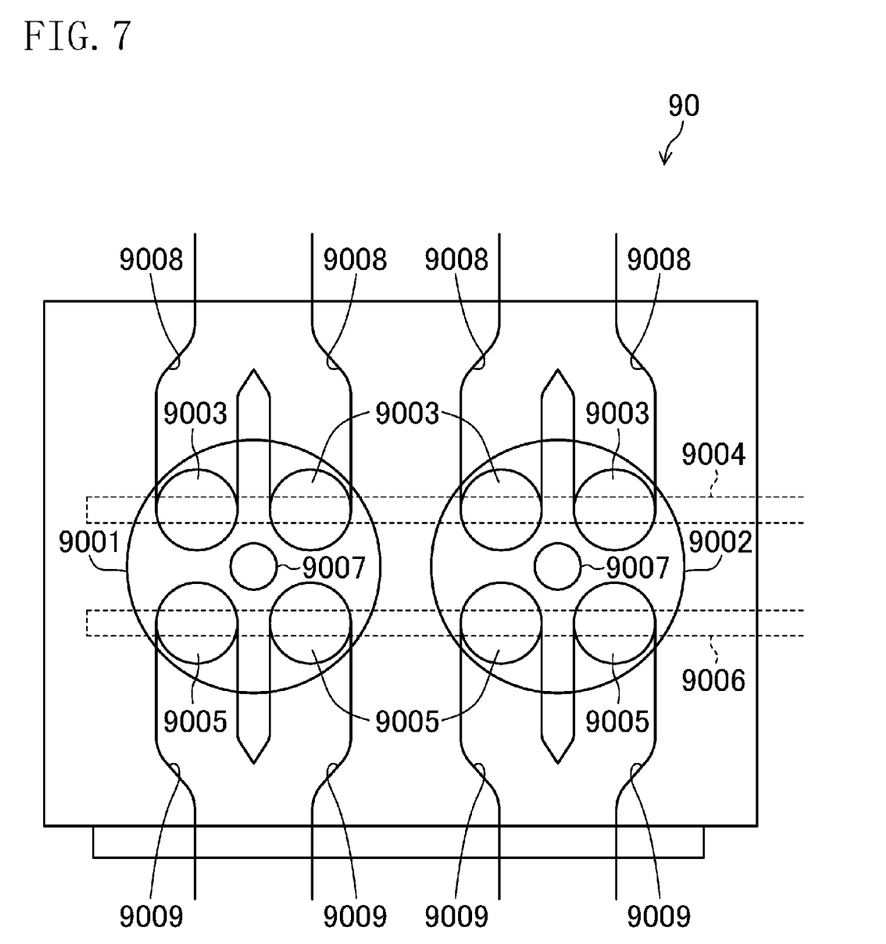
FIG. 7 conceptually shows a configuration for a four-cycle two-cylinder reciprocating engine.

In the configuration above described, the stop control technique disclosed herein is applied to the rotary piston engine 9. The technique disclosed herein may be also applied to a four-cycle two-cylinder reciprocating engine. FIG. 7 schematically shows a configuration for a four-cycle two-cylinder reciprocating engine 90 which may be mounted in a range extender 4. This engine 90 includes a first cylinder 9001 and a second cylinder 9002 arranged in series along a crankshaft (i.e., an output shaft) which is not shown. Two intake ports 9008 and 9008 are connected to each of the cylinders 9001 and 9002. Each intake port 9008 is opened and closed by an intake valve 9003 although the details are not shown. Each intake valve 9003 is opened and closed by a camshaft 9004 that is coupled to, and rotates in synchronization with, the crankshaft. Thus, each intake port 9008 is opened and closed in synchronization with the rotation of the crankshaft.

Likewise, two exhaust ports 9009 and 9009 are connected to each of the cylinders 9001 and 9002. Each exhaust port 9009 is opened and closed by an exhaust valve 9005 although the details are not shown. Each exhaust valve 9005 is opened and closed by a camshaft 9006 that is coupled to, and rotates in synchronization with, the crankshaft. Thus, each exhaust port 9009 is also opened and closed in synchronization with the rotation of the crankshaft.

An ignition plug 9007 for igniting the fuel-air mixture in the combustion chamber is mounted to each of the cylinders 9001 and 9002. Further, each of the cylinders 9001 and 9002 is provided with a fuel injection valve (not shown in FIG. 7) mounted thereto for directly injecting fuel into the cylinder.

Figure 8:
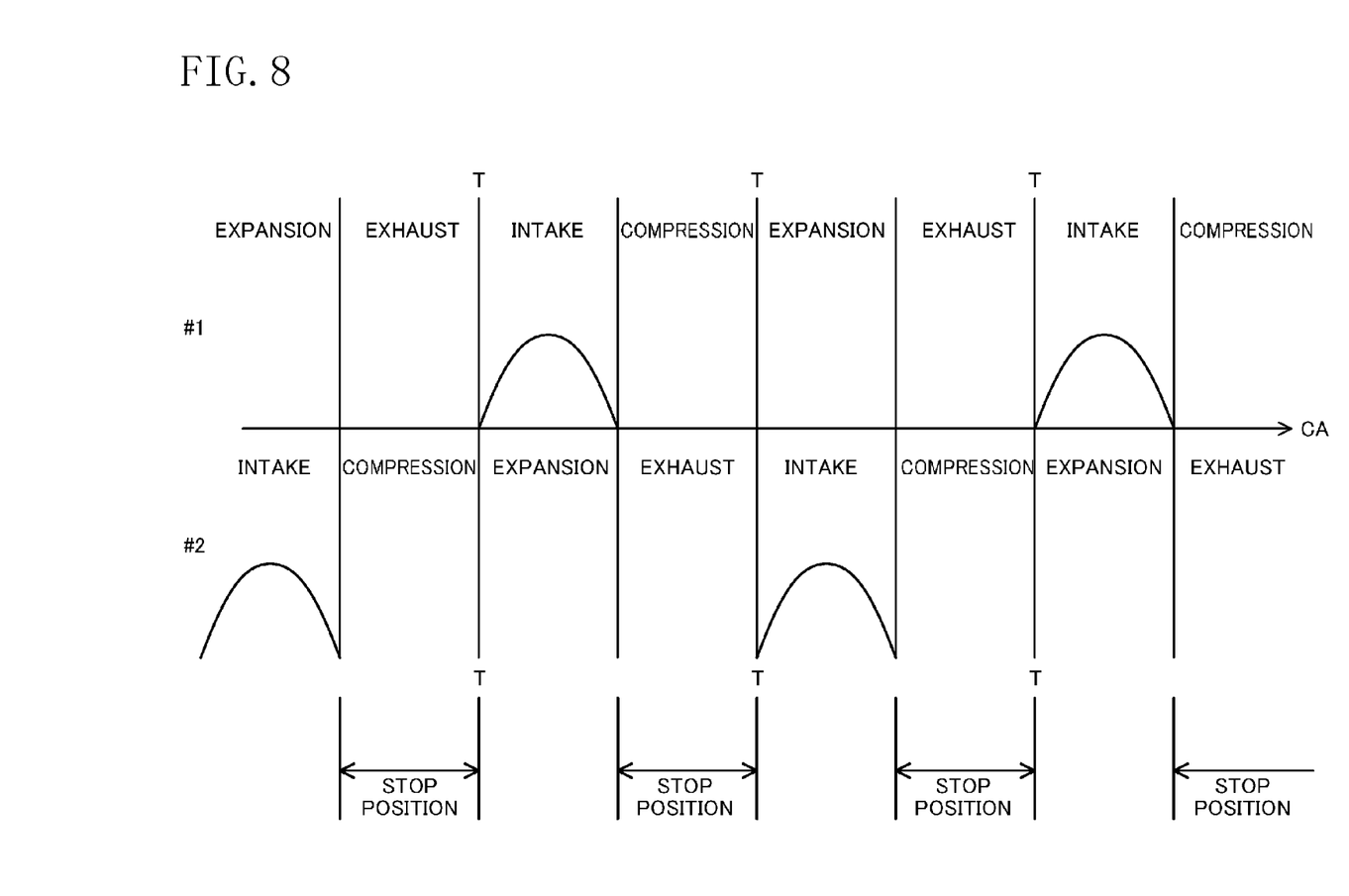
FIG. 8 is a diagram for explaining crank angle positions observed when a four-cycle two-cylinder reciprocating engine stops completely.

The four-cycle two-cylinder reciprocating engine 90 is configured such that the first cylinder 9001 and the second cylinder 9002 perform a cycle including the intake, compression, expansion, and exhaust strokes, with a phase difference of 360°. With this configuration, as shown in FIG. 8, when the first cylinder 9001 (see the upper half of FIG. 8) is in the compression stroke or the exhaust stroke, the second cylinder 9002 (see the lower half of FIG. 8) is in the exhaust stroke or the compression stroke, and the intake ports 9008 of both the first and second cylinders 9001 and 9002 are closed. Note that the mountain-shaped curves shown in FIG. 8 indicate lift of the intake valves 9003. When allowing the engine 90 to stop automatically or forcing the engine 90 to stop, the PCU controls a generator 41 based on a signal from an engine stop position sensor 85 during the period from the start of fuel cut of the engine 90 to a moment when the engine 90 stops in a manner as described above. This control causes the engine 90 to stop at a position (i.e., the crankshaft to come, in its rotational direction, to a position) which is within the periods during which the intake ports 9008 of the first and second cylinders 9001 and 9002 are all closed (see "STOP POSITION" in FIG. 8).

During the period from the start of fuel cut of the engine 90 to the moment when the engine 90 stops, the ignition plugs 9007 of the first and second cylinders 9001 and 9002 are actuated when the compression stroke takes place. In this manner, unburnt fuel remaining in the cylinders 9001 and 9002 is burnt.

If the engine 90 stops at a position different from the target stop position, the generator 41 may be operated to drive the engine 90, thereby causing the engine 90 to stop at the target stop position.

Thus, also in the four-cycle two-cylinder reciprocating engine 90, even if the fuel or other substances that have adhered to the surface of the inner wall of the chamber and that have seeped from the fuel injection valve due to poor oil tightness evaporate when engine 90 is stationary, the release of the resultant evaporative emission into the atmosphere through the intake passage may be reduced.

Note that if the engine 90 has a configuration different from that shown in FIG. 8, specifically, if the phase difference between the first and second cylinders 9001 and 9002 is not 360° (, but 180°, for example), the engine 90 may be stopped at a position within the periods during which the intake ports 9008 are all closed. This is because the periods in which the intake ports 9008 of the two cylinders 9001 and 9002 are closed necessarily exist in the four-cycle two-cylinder reciprocating engine 90.

Note that the rotary piston engine and the reciprocating engine do not have to be employed as the internal combustion engine included in the range extender 4 and used for driving the generator 41, as described above. The technique disclosed herein is applicable to engines mounted in hybrid motor vehicles and plug-in hybrid vehicles. The internal combustion engine mounted in such a hybrid vehicle or plug-in hybrid vehicle is not limited to one for driving a generator, but may be used for driving a generator and for running. Further, the technique disclosed herein may be applied widely to stop control of rotary piston engines and reciprocating engines that are mounted in vehicles other than hybrid vehicle and used as normal internal combustion engines for running. The accessory for use in stop control of these internal combustion engines may be configured as a compressor of an air conditioner, instead of a generator (including an alternator).

What is claimed is:

1. A stop control system comprising:
   a direct-injection internal combustion rotary piston engine;
   a triangle rotor that rotates around an output shaft of the engine;
   a rotor housing that houses the rotor;
   first, second and third apexes of the triangle rotor that slide along an inner peripheral surface of the rotor housing;
   a fuel injection valve provided at the inner peripheral surface of the rotor housing, and having a fuel injection opening that injects fuel directly into a chamber defined in the internal combustion rotary piston engine;

an accessory configured to be driven by the internal combustion rotary piston engine; and a controller configured to operate the internal combustion rotary piston engine, wherein the internal combustion rotary piston engine has an intake port communicating with an inside of the chamber and configured to be opened and closed in synchronization with rotation of an output shaft of the internal combustion rotary piston engine, an opening of the intake port formed at the inner peripheral surface of the rotor housing is at a point on a retard side in a rotational direction of the rotor with respect to the injection opening of the fuel injection valve, and the controller controls the accessory to provide rotational resistance to the internal combustion rotary piston engine during a period from start of fuel cut that is cutting off of fuel supply to the internal combustion rotary piston engine by the fuel injection valve to a moment immediately after the internal combustion rotary piston engine stops, such that when the internal combustion rotary piston engine stops completely, at least one of the apexes of the triangle rotor stops between the fuel injection opening and the opening of the intake port, in a rotational direction.

2. The system of claim 1, further comprising:

a position information acquirer configured to estimate or detect a position to which the output shaft comes in the rotational direction when the internal combustion rotary piston engine stops, wherein the controller controls the accessory based on a signal from the position information acquirer so as to cause the output shaft to come, in the rotational direction, to the target stop position when the internal combustion rotary piston engine stops completely.

3. The system of claim 1, wherein the accessory is configured as a generator capable of driving the internal combustion rotary piston engine, and the controller causes, by driving the internal combustion rotary piston engine by the generator, the output shaft to come, in the rotational direction, to the target stop position when the internal combustion rotary piston engine stops completely.

4. The system of claim 1, wherein during a period from start of the fuel cut which is carried out, upon satisfaction of a predetermined condition, for automatically stopping the internal combustion rotary piston engine to a moment when the internal combustion rotary piston engine stops, the controller controls the accessory such that the output shaft comes, in the rotational direction, to the target stop position when the internal combustion rotary piston engine stops completely.

5. The system of claim 4, wherein the controller causes, by providing rotational resistance to the internal combustion rotary piston engine by the accessory, the output shaft to come, in the rotational direction, to the target stop position when the internal combustion rotary piston engine stops completely.

6. The system of claim 5, wherein the accessory is configured as a generator capable of driving the internal combustion rotary piston engine, and upon the output shaft arriving, in the rotational direction, at a position different from the target stop position when the internal combustion rotary piston engine stops, the controller drives the internal combustion rotary piston engine by the generator so as to cause the output shaft to come, in the rotational direction, to the target stop position.

7. The system of claim 4, wherein the accessory is configured as a generator capable of driving the internal combustion rotary piston engine, and upon the output shaft arriving, in the rotational direction, at a position different from the target stop position when the internal combustion rotary piston engine stops, the controller drives the internal combustion rotary piston engine by the generator so as to cause the output shaft to come, in the rotational direction, to the target stop position.

8. The system of claim 1, further comprising:

an ignition plug, wherein the controller is configured to actuate, after the start of the fuel cut, the ignition plug in the chamber during a compression stroke.

9. A stop control system comprising:

a direct-injection internal combustion rotary piston engine having an intake port configured to be opened and closed in synchronization with rotation of an output shaft;

a triangle rotor that rotates around the output shaft;

a rotor housing that houses the rotor;

first, second and third apexes of the triangle rotor that slide along an inner peripheral surface of the rotor housing;

a fuel injection valve provided at the inner peripheral surface of the rotor housing, and having a fuel injection opening that injects fuel directly into a chamber which communicates with the intake port;

an accessory configured to be driven by the internal combustion rotary piston engine;

an opening of the intake port formed at the inner peripheral surface of the rotor housing is at a point on a retard side in a rotational direction of the rotor with respect to the injection opening of the fuel injection valve;

a position information acquirer configured to estimate or detect a position to which the output shaft comes in a rotational direction when the internal combustion rotary piston engine stops; and an accessory controller that receives a signal from the position information acquirer during a period from start of fuel cut that is cutting off of fuel supply to the internal combustion rotary piston engine by the fuel injection valve to a moment immediately after the internal combustion rotary piston engine stops, and outputs a signal for controlling the accessory such that when the internal combustion rotary piston engine stops completely, at least one of the apexes of the triangle rotor stops between the fuel injection opening and the opening of the intake port, in a rotational direction.

10. The system of claim 9, wherein the accessory is configured as a generator, the system further includes an inverter provided between the generator and the accessory controller, and the accessary controller outputs a control signal to the inverter, and controls the generator via the inverter.

11. The system of claim 10, wherein during a period from the start of the fuel cut to a moment when the internal combustion rotary piston engine stops, the accessory controller outputs a control signal to the inverter such that the generator provides rotational resistance to the internal combustion rotary piston engine.

12. The system of claim 10, wherein immediately after a moment when the internal combustion rotary piston engine stops, the accessory controller outputs a control signal to the inverter such that the generator drives the internal combustion rotary piston engine so as to cause the output shaft to come, in the rotational direction, to a target stop position.

13. The system of claim 9, wherein the accessory is a generator that performs motoring of the internal combustion rotary piston engine, the accessory controller operates the generator motoring the internal combustion rotary piston engine to stop at the target stop position when the position information acquirer estimates or detects a position different from the target stop position.

14. A stop control method for a direct-injection internal combustion rotary piston engine having a triangle rotor that rotates around an output shaft of the engine, a rotor housing that houses the rotor, and first, second and third apexes of the triangle rotor that slide along an inner peripheral surface of the rotor housing comprising:

cutting off fuel supply by a fuel injection opening provided at the inner peripheral surface of the rotor housing to a direct-injection internal combustion rotary piston engine;

during a period from the cutting off of the fuel supply to a moment when the internal combustion rotary piston engine stops, controlling an accessory coupled to the internal combustion rotary piston engine such that rotational resistance is applied to the internal combustion rotary piston engine; and causing an output shaft of the internal combustion rotary piston engine to come, in a rotational direction, to a target stop position where at least one of the apexes of the triangle rotor stops between the fuel injection opening and an opening of an intake port that is formed at the inner peripheral surface and that is at a point on a retard side in a rotational direction of the rotor with respect to the injection opening, in a rotational direction, by providing rotational resistance to the internal combustion rotary piston engine, when the internal combustion rotary piston engine stops completely.

15. The method of claim 14, further comprising:

immediately after internal combustion rotary piston engine stops, causing the accessory to drive the internal combustion rotary piston engine so as to cause the output shaft to come, in a rotational direction, to the target stop position.

* * * * *